United States Patent
Ponticiello et al.

(10) Patent No.: US 7,612,119 B2
(45) Date of Patent: Nov. 3, 2009

(54) EXPANDABLE VINYLAROMATIC POLYMERS AND PROCESS FOR THEIR PREPARATION

(75) Inventors: Antonio Ponticiello, Verona (IT); Alessandra Simonelli, Turin (IT); Loris Zamperlin, Porto Mantovano-Mantova (IT)

(73) Assignee: Polimeri Europa S.p.A., Brindisi (IT)

( * ) Notice: Subject to any disclaimer, the term of this patent is extended or adjusted under 35 U.S.C. 154(b) by 393 days.

(21) Appl. No.: 10/551,524

(22) PCT Filed: Mar. 11, 2004

(86) PCT No.: PCT/EP2004/002840

§ 371 (c)(1),
(2), (4) Date: Aug. 15, 2006

(87) PCT Pub. No.: WO2004/087798

PCT Pub. Date: Oct. 14, 2004

(65) Prior Publication Data

US 2006/0276557 A1    Dec. 7, 2006

(30) Foreign Application Priority Data

Mar. 31, 2003   (IT) .......................... MI2003A0627

(51) Int. Cl.
*C08J 9/16* (2006.01)
*C08K 3/04* (2006.01)
*C09C 1/48* (2006.01)

(52) U.S. Cl. .............. 521/56; 521/57; 521/80; 521/146; 521/147; 521/148; 524/496; 524/855

(58) Field of Classification Search ............ 521/80, 521/146, 56, 57, 147, 148; 524/496, 855
See application file for complete search history.

(56) References Cited

U.S. PATENT DOCUMENTS

| 3,354,243 | A |   | 11/1967 | Dodge |  |
|-----------|---|---|---------|-------|--|
| 5,210,105 | A | * | 5/1993  | Paquet et al. ................ 521/99 |
| 5,352,289 | A | * | 10/1994 | Weaver et al. ................ 106/476 |
| 7,279,504 | B2 | * | 10/2007 | Ghidoni et al. ............... 521/56 |

FOREIGN PATENT DOCUMENTS

EP    0 372 343    6/1990

* cited by examiner

*Primary Examiner*—Fred M Teskin
(74) *Attorney, Agent, or Firm*—Oblon, Spivak, McClelland, Maier & Neustadt, L.L.P.

(57) ABSTRACT

Expandable vinylaromatic polymers which comprise: a) a matrix obtained by polymerizing 50-100% by weight of one or more vinylaromatic monomers and 0-50% by weight of a copolymerizable monomer; b) 1-10% by weight, calculated with respect to the polymer (a) of an expanding agent englobed in the polymeric matrix; c) 0.01-20% by weight, calculated with respect to the polymer (a) of carbon black distributed in the polymeric matrix having an average diameter ranging from 30 to 2000 nm, a surface area ranging from 5 to 40 $m^2/g$, a sulfur content ranging from 0.1 to 2000 ppm and an ash content ranging from 0.001 to 1%.

23 Claims, No Drawings

EXPANDABLE VINYLAROMATIC POLYMERS AND PROCESS FOR THEIR PREPARATION

The present invention relates to expandable vinylaromatic polymers and the process for their preparation.

More specifically, the present invention relates to a process for the preparation of expandable vinylaromatic polymers which, after expansion, have a reduced thermal conductivity also at a low density, and the products thus obtained.

Expandable vinylaromatic polymers and, among these, in particular, expandable polystyrene, are products which have been known and used for a long time for preparing expanded articles which can be used in different fields of application, among which one of the most important is thermal insulation.

These expanded products are obtained by swelling in a closed mould beads of expandable polymer impregnated with a gas and molding the swollen particles contained inside the mould by means of the contemporaneous effect of pressure and temperature. The swelling of the particles is generally effected with vapour, or another gas, maintained at a temperature slightly higher than the glass transition temperature (Tg) of the polymer.

A particular applicative field of expanded polystyrene is that of thermal insulation in the building industry where it is generally used in the form of flat sheets. The flat expanded polystyrene sheets are normally used with a density of about 30 g/l as the thermal conductivity of the polymer has a minimum at these values. It is not advantageous to fall below this limit, even if it is technically possible, as it causes a drastic increase in the thermal conductivity of the sheet which must be compensated by an increase in its thickness. To avoid this drawback, suggestions have been made to fill the polymer with athermanous materials such as graphite, carbon black or alumina (European patent 620,246).

Published Japanese patent application JP 61-171,705 describes a method for preparing particles of polystyrene, also expandable, filled with carbon black which comprises the polymerization in aqueous suspension of styrene in the presence of bifunctional organic peroxides without the benzene ring and carbon black with dimensions of less than 100 nm. The process also comprises the addition, during or at the end of the polymerization, of an expanding agent, for example isopentane, whose concentration can vary from 1 to 6% by weight with respect to the polystyrene.

The radicalic polymeric reaction of vinyl monomers in the presence of carbon black is heavily delayed when peroxides containing benzene rings are used, as described in K. Ohkita, "Carbon", 13, 443-448, 1975, to such an extent that carbon black is even used as an inhibitor of peroxides containing benzene rings in the polymerization of styrene (U.S. Pat. No. 2,993,903).

The Applicant has now found that it is possible to obtain expandable styrene polymers filled with carbon black, capable of providing low density expanded materials, with characteristics comparable to those of the materials obtained with the method of the known art, using the peroxides normally used in the polymerization, in aqueous suspension, of expandable polystyrene, and consequently without having to use peroxides not containing benzene rings. It is therefore possible to obtain products based on vinylaromatic polymers with a thermal conductivity capable of also satisfying class 035 of the DIN 18164 regulation Part 1, by incorporating therein a particular type of carbon black.

An object of the present invention therefore relates to expandable vinylaromatic polymers which comprise:

a) a matrix obtained by polymerizing 50-100% by weight of one or more vinylaromatic monomers and 0-50% by weight of at least one copolymerizable monomer;

b) 1-10% by weight, calculated with respect to the polymer (a), of an expanding agent englobed in the polymeric matrix;

c) 0.01-20% by weight, calculated with respect to the polymer (a), of a carbon black filler homogeneously distributed in the polymeric matrix having an average diameter ranging from 30 to 2000 nm, a surface area ranging from 5 to 40 $m^2/g$, a sulfur content ranging from 0.1 to 1000 ppm and an ash content ranging from 0.001 to 1%.

According to the present invention, the carbon black is also characterized by a weight loss with heat ranging from 0.001 to 1%, an iodine number ranging from 0.001 to 20 g/kg and an absorption value of dibutylphthalate (DBPA) ranging from 5 to 100 ml/(100 g).

The term "vinylaromatic monomer", as used in the present description and claims, essentially refers to a product which corresponds to the following general formula:

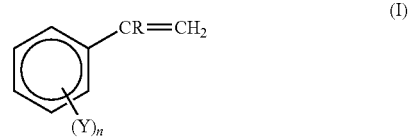

wherein R is a hydrogen or a methyl group, n is zero or an integer ranging from 1 to 5 and Y is a halogen, such as chlorine or bromine, or an alkyl or alkoxyl radical having from 1 to 4 carbon atoms.

Examples of vinylaromatic monomers having the general formula defined above are: styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, etc. Preferred vinylaromatic monomers are styrene and α-methylstyrene.

The vinylaromatic monomers having general formula (I) can be used alone or in a mixture of up to 50% by weight with other copolymerizable monomers. Examples of these monomers are (meth)acrylic acid, $C_1$-$C_4$ alkyl esters of (meth)acrylic acid, such as methyl acrylate, methylmethacrylate, ethyl acrylate, ethylmethacrylate, isopropyl acrylate, butyl acrylate, amides and nitrites of (meth)acrylic acid such as acrylamide, methacrylamide, acrylonitrile, methacrylonitrile, butadiene, ethylene, divinylbenzene, maleic anhydride, etc. Preferred copolymerizable monomers are acrylonitrile and methylmethacrylate.

Any expanding agent capable of being englobed in the vinylaromatic polymeric matrix, can be used in a combination with the expandable polymers object of the present invention. Typical examples are aliphatic hydrocarbons, freon, carbon dioxide, water, etc.

The carbon black filler has an average diameter ranging from 30 to 2000 nm, preferably from 100 to 1000, a specific surface ranging from 5 to 40 $m^2/g$, preferably from 8 to 20 $m^2/g$, (measured according to ASTM D-6556), a sulfur content ranging from 0.1 to 2000 ppm, preferably from 1 to 500 ppm, an ash residue ranging from 0.001 to 1%, preferably from 0.01 to 0.3% (measured according to ASTM D-1506), a weight loss with heat (measured according to ASTM D-1509) ranging from 0.001 to 1%, preferably from 0.01 to 0.5%, a DBPA (measured according to ASTM D-2414) of 5-100 ml/(100 g), preferably 20-80 ml/(100 g) and an iodine number (measured according to ASTM D-1510) ranging from 0.01 to 20 g/kg, preferably from 0.1 to 10 g/kg. Said filler can be added to the vinylaromatic polymer either by means of polymerization in suspension or by means of the continuous mass technology, in such quantities as to give a final concentration in the polymer of 0.01 to 20% by weight, preferably from 0.1 to 5%.

The carbon black used in the present invention can be prepared according to the following main technologies:

furnace process (partial combustion of a liquid containing aromatic hydrocarbons);

thermal black process (method based on the decomposition of natural gas or liquid hydrocarbons in the absence of air or flame);

acetylene black process (thermal decomposition process, 800-1000° C., at atmospheric pressure);

lampblack process (combustion of various liquids or raw materials in the absence of air).

Greater details can be found, f or example, in the Kirk-Othmer encyclopedia, edition 4, volume 4.

At the end of the addition of the filler, an expandable polymer is obtained, which can be transformed to produce expanded articles having a density ranging from 5 to 50 g/l, preferably from 10 to 25 g/l. These materials also have an excellent thermal insulation capacity expressed by a thermal conductivity ranging from 25 to 50 mW/mK, preferably from 30 to 45 mW/mK which is generally on an average even over 10% lower than that of equivalent non-filled expanded materials currently on the market, for example EXTIR A-5000 of Polimeri Europa S.p.A. Thanks to these characteristics of the expandable polymers, object of the present invention, it is possible to prepare thermo-insulating articles with significant material saving or, for example to prepare sheets having a lesser thickness than those produced with traditional non-filled polymers, with a consequent reduction in space.

Conventional additives, generally used with traditional materials, such as pigments, stabilizers, flame-retardants, antistatic agents, detaching agents, etc. can be added to the expandable polymers object of the present invention.

A further object of the present invention relates to the processes for the preparation of expandable polymers with an improved thermal conductivity, with a density, after expansion, lower than 30 g/l.

In particular, a further object of the present invention relates to a process for preparing expandable vinylaromatic polymers which comprises polymerizing in aqueous suspension one or more vinylaromatic monomers, optionally together with at least one polymerizable comonomer in a quantity of up to 50% by weight, in the presence of carbon black having an average diameter ranging from 30 to 2000 nm, a surface area ranging from 5 to 40 $m^2/g$, a sulfur content ranging from 0.1 to 2000 ppm and an ash residue ranging from 0.001 to 1% and in the presence of a peroxide radicalic initiator, optionally containing at least one aromatic ring, and an expanding agent added before, during or at the end of the polymerization. The carbon black is also characterized by a weight loss with heat ranging from 0.001 to 1%, an iodine number ranging from 0.001 to 20 g/kg and a DBPA value ranging from 5 to 100 ml/(100 g).

The polymerization is carried out in aqueous suspension with inorganic salts of phosphoric acid, for example tricalcium phosphate or magnesium phosphate. These salts can be added to the polymerization mixture either already finely subdivided or synthesized in situ by reaction, for example, between sodium pyrophosphate and magnesium sulfate.

These inorganic salts are coadjuvated by additives known to experts in the field, such as anionic surface-active agents, for example sodium dodecylbenzenesulfonate or sodium metadisulfite, as described in U.S. Pat. No. 3,631,014.

The polymerization can also be carried out in the presence of organic suspending agents such as polyvinyl pyrrolidone, polyvinyl alcohol, etc.

The initiator system generally comprises two peroxides, the first with a halving time of one hour at 85-95° C. and the other with a halving time of one hour at 110-120° C. Examples of these initiators are benzoyl peroxide and ter-butyl perbenzoate.

The vinylaromatic polymer, or copolymer, obtained has a molecular weight Mw ranging from 50,000 to 220,000, preferably from 70,000 to 200,000. Greater details on processes for the preparation of expandable vinylaromatic polymers in aqueous solution, or more generally, on polymerization in suspension can generally be found in the Journal of Macromolecular Science, Review in Macromolecular Chemistry and Physics c31 (263) 215-299 (1991) or in international patent application WO 98/51734.

To improve the stability of the suspension, it is possible to increase the viscosity of the reagent solution by dissolving a quantity of vinylaromatic polymer therein, in a concentration ranging from 1 to 30% by weight, preferably from 5 to 20%, calculated with respect to the monomer alone. The solution can be obtained either by diluting a preformed polymer (for example fresh polymer or the waste products of previous polymerizations and/or expansions) in the reagent mixture or by pre-polymerizing the monomer, or mixture of monomers, in mass, until the above concentrations are reached, and then continuing the polymerization in aqueous suspension in the presence of the remaining additives.

During the polymerization in suspension, polymerization additives, typically used for producing expandable vinylaromatic polymers, are adopted, such as stabilizing agents of the suspension, chain transfer agents, expanding aids, nucleating agents, plasticizers, etc. In particular, it is preferable to add flame-retardant agents during the polymerization, in a quantity ranging from 0.1% to 8% by weight, with respect to the weight of the resulting polymer. Flame-retardant agents particularly suitable for the expandable vinylaromatic polymers, object of the present invention, are brominated aliphatic, cycloaliphatic, aromatic compounds such as hexabromocyclododecane pentabromomonochlorocyclohexane and pentabromophenyl allyl ether.

The expanding agents are preferably added during the polymerization phase and are selected from aliphatic or cycloaliphatic hydrocarbons containing from 3 to 6 carbon atoms such as n-pentane, isopentane, cyclo-pentane or their mixtures; halogenated derivatives of aliphatic hydrocarbons containing from 1 to 3 carbon atoms such as, for example, dichlorodifluoromethane, 1,2,2-trifluoroethane, 1,1,2-trifluoroethane; carbon dioxide and water.

At the end of the polymerization, substantially spherical polymer beads are obtained, with an average diameter ranging from 0.2 to 2 mm, inside which the additive is homogeneously dispersed.

The beads are then discharged from the polymerization reactor and washed, in continuous and batchwise with non-ionic surface-active agents or, alternatively, with acids, as described in U.S. Pat. No. 5,041,465.

A further object of the present invention relates to a process for preparing in mass and in continuous, expandable vinylaromatic polymers, which comprises the following steps in series:

i. feeding a vinylaromatic polymer, as described above, to an extruder, together with a carbon black filler, having an average diameter ranging from 30 to 2000 nm, a surface area ranging from 5 to 40 m²/g, a sulfur content ranging from 0.1 to 2000 ppm and an ash residue ranging from 0.001 to 1%. The carbon black is also characterized by a weight loss with heat ranging from 0.001 to 1%, an iodine number ranging from 0.001 to 20 g/kg and a DBPA value ranging from 5 to 100 ml/(100 g)

ii. heating the vinylaromatic polymer to a temperature higher than the relative melting point;

iii. injecting the expanding agent and possible additives such as flame-retardant agents, into the molten polymer before extrusion through a die; and iv. forming expandable beads, through a die, in a substantially spherical form with an average diameter ranging from 0.2 to 2 mm.

A detailed method for preparing vinylaromatic polymers in mass and in continuous is provided in European patent EP 126,459.

At the end of the polymerization, whether it be carried out in suspension or in mass and in continuous, the expandable beads produced are subjected to pre-treatment generally applied to conventional expandable beads and which essentially consists in:

1. coating the beads with a liquid antistatic agent such as amines, tertiary ethoxylated alkylamines, ethylene oxide-propylene oxide copolymers, etc. The purpose of this agent is to facilitate both the adhesion of the coating and also the screening of the beads prepared in suspension;

2. applying the coating to the above beads, said coating essentially consisting of a mixture of mono-, di- and trimesters of glycerin (or other alcohols) with fatty acids and of metallic stearates such as zinc and/or magnesium stearate, optionally mixed with the carbon black.

Some illustrative but non-limiting examples are provided for a better understanding of the present invention and for its embodiment.

EXAMPLE 1

A mixture of 150 parts by weight of water, 0.2 parts of sodium pyrophosphate, 100 parts of styrene, 0.25 parts of benzoyl peroxide, 0.25 parts of ter-butyl perbenzoate and 1 part of carbon black T990 sold by the company CONCARB of Houston, Tex. (USA) with an average diameter of about 362 nm, a BET of 10 m²/g, an ash content of 0.02%, a sulfur content equal to 60 ppm, a weight loss with heat of 0.1%, a DBPA number of 44 ml/(100 g), are charged into a stirred closed container. The mixture is heated to 90° C. under stirring.

After about 2 hours at 90° C., 4 parts of a solution at 10% of polyvinylpyrrolidone are added. The mixture is heated, still under stirring, for a further 2 hours to 100° C., 7 parts of a 70/30 mixture of n-pentane and i-pentane are added, the mixture is heated for a further 4 hours to 125° C., it is then cooled and the batch discharged. A certain quantity of foam was present when discharging.

The beads of expandable polymer thus produced are subsequently recovered and washed with demineralized water containing 0.05% of a non-ionic surface-active agent consisting of a fatty alcohol condensed with ethylene oxide and propylene oxide, sold by Huntsman under the trade-name of Empilan 2638. They are then dried in a stream of warm air, 0.02% of ethoxylated amine are added, and screened separating the fraction with a diameter ranging from 1 to 1.5 mm.

This fraction proved to be 40%, a 30% fraction being between 0.5 and 1 mm, a 15% fraction between 0.2 and 0.5 mm and the gross fraction of 15%, between 1.5 and 3 mm.

0.2% of glyceryl monosterate and 0.1% of zinc stearate are then added to the fraction from 1 to 1.5 mm.

The product is pre-expanded with vapour at a temperature of 100° C., aged for a day and used for the moulding of blocks (dimensions: 1040×1030×550 mm).

The blocks were then cut to prepare flat sheets on which the thermal conductivity was measured. The thermal conductivity was 36.5 mW/mK whereas that of a sheet having the same density (14 g/l) prepared with a traditional reference product (EXTIR A-5000), was 42.5 mW/mK.

EXAMPLE 2

A mixture of 150 parts by weight of water, 0.2 parts of sodium tricalcium phosphate, 100 parts of styrene, 0.25 parts of benzoyl peroxide, 0.25 parts of ter-butyl perbenzoate, 0.01 part of sodium dodecylbenzenesulfonate and 1 part of carbon black used in Example 1 are charged into a stirred closed container. The mixture is heated to 90° C. under stirring.

After about 2 hours at 90° C., the mixture is heated for a further 2 hours to 100° C. and 7 parts of a 70/30 mixture of n-pentane and i-pentane are added, the mixture is heated for a further 4 hours to 125° C., it is then cooled and discharged. When discharging the reactor, a heavy foam was present, which can be eliminated with antifoam agents known in the art or with abundant washing water.

The beads of expandable polymer thus produced are processed as described in Example 1, separating the fraction ranging from 1 to 1.5 mm.

This fraction proved to be 60%, a 25% fraction being between 0.5 and 1 mm, a 5% fraction between 0.2 and 0.5 mm and the gross fraction of 10%, between 1.5 and 3 mm.

0.2% of glyceryl monosterate and 0.1% of zinc stearate are then added to the fraction from 1 to 1.5 mm.

The expansion and moulding were effected as described in Example 1. The thermal conductivity proved to be identical to that of Example 1.

EXAMPLE 3

Example 2 was repeated with the exception of sodium dodecylbenzenesulfonate, which was substituted with 0.01% of sodium metadisulfite.

When the reactor was discharged, the presence of foam was negligible.

The beads of expandable polymer thus produced are processed as described in Example 1, separating the fraction ranging from 1 to 1.5 mm.

This fraction proved to be 75%, a 10% fraction being between 0.5 and 1 mm, a 5% fraction between 0.2 and 0.5 mm and the gross fraction of 10%, between 1.5 and 3 mm.

The fraction between 1 and 1.5 mm is then washed as described in Example 1. There was no variation in the thermal conductivity.

EXAMPLE 4

Example 3 was repeated adding, together with the styrene, 0.7% of hexabromocyclododecane and 0.2% of dicumyl peroxide to make the product fire-resistant.

When the reactor was discharged, the presence of foam was negligible.

The beads of expandable polymer thus produced are processed as described in Example 1, separating the fraction ranging from 1 to 1.5 mm.

This fraction proved to be 70%, a 10% fraction being between 0.5 and 1 mm, 5% fraction between 0.2 and 0.5 mm and the gross fraction of 15%, between 1.5 and 3 mm.

The fraction between 1 and 1.5 mm is then washed as described in Example 1. The sheets are placed in an oven at 70° C. for 2 days to remove the residual pentane; test samples are then taken (9 cm×19 cm×2 cm) for the fire-behaviour test according to the regulation DIN 4102. The samples passed the test.

EXAMPLE 5

97.8 parts of a polystyrene having a Melt Index of 12 g/10' at 200° C./5 kg premixed with 1 part of carbon black used in example 1, 1 part of hexabromocyclododecane (Saytex HP 900 sold by Albemarle) and 0.2 parts of diphenybutane (Perkadox 30 sold by Akzo), are fed to a twin-screw extruder equipped with a feeding hopper. After bringing the polymer to the molten state, 7 parts of a mixture of n-pentane/i-pentane with a weight ratio of 70/30, are injected.

The resulting mass is drawn through an extrusion head equipped with holes. The polymer emerging from the holes is cut by a series of rotating knives in contact with the surface of the die in order to obtain substantially spherical beads having an average diameter of about 1.2 mm. The die is immersed in a water bath.

The beads are sent by the stream of water, cooled to 35° C., separated from the water and dried in a stream of warm air.

Amine and the coating of Example 1 are then added to the beads.

The beads are then expanded, moulded and, as in the previous examples, samples of sheets are taken for the fire-behaviour test. The samples passed the fire test according to DIN 4102.

EXAMPLE 6 (COMPARATIVE)

Example 1 was repeated, substituting the carbon black of CONCARB with a type of carbon black having a diameter of 15 nm, a specific surface of 200 m²/g sold be DEGUSSA under the trade-name of Printex 85™.

After 60' at 90° C. the suspension is agglomerated as the beads have adhered to each other; the conversion of styrene to polymer was also low (10%).

The invention claimed is:

1. An expandable vinylaromatic polymer, comprising:
   a) a polymeric matrix obtained by polymerizing 50-100% by weight of one or more vinylaromatic monomers and 0-50% by weight of a copolymerizable monomer;
   b) 1-10% by weight, calculated with respect to the polymer (a), of an expanding agent embedded in the polymeric matrix;
   c) 0.01-20% by weight, calculated with respect to the polymer (a), of carbon black homogeneously distributed in the polymeric matrix and having an average diameter ranging from 30 to 2000 nm, a surface area ranging from 5 to 40 m²/g, a sulfur content ranging from 0.1 to 2000 ppm and an ash content ranging from 0.001 to 1%.

2. The polymers according to claim 1, wherein the carbon black has a weight loss with heat ranging from 0.001 to 1%, an iodine number ranging from 0.00 1 to 20 g/kg and an absorption value of dibutylphthalate ranging from 5 to 100 ml/(100 g).

3. The polymers according to claim 1, wherein the vinylaromatic monomer is selected from the group consisting of monomers the following general formula:

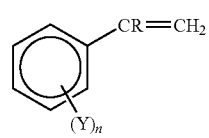

wherein R is a hydrogen or a methyl group, n is zero or an integer ranging from 1 to 5 and Y is a halogen, or an alkyl or alkoxyl radical having from 1 to 4 carbon atoms.

4. The polymers according to claim 3, wherein the vinylaromatic monomer having general formula (I) is used in a mixture, of up to 50% by weight, with at least one other copolymerizable monomer selected from the group consisting of (meth)acrylic acid, $C_1$-$C_4$ alkyl esters of (meth)acrylic acid, amides of (meth) acrylic acid, nitriles of (meth)acrylic acid, butadiene, ethylene, divinylbenzene, and maleic anhydride.

5. The polymers according to claim 4, wherein the copolymerizable monomer is acrylonitrile and methylmethacrylate.

6. The polymers according to claim 1, wherein the carbon black has an average diameter ranging from 100 to 1000 nm, a surface area ranging from 8 to 20 m²/g, (measured according to ASTM D-6556), a sulfur content ranging from 1 to 500 ppm, an ash residue ranging from 0.01 to 0.3% (measured according to ASTM D-1506), a weight loss with heat (measured according to ASTM D-1509) ranging from 0.01 to 0.5%, an absorption value of dibutylphthalate (measured according to ASTM D-2414) of 20-80 ml/(100 g) and an iodine number (measured according to ASTM D-1510) ranging from 0.1 to 10 g/kg.

7. The polymers according to claim 1, wherein the carbon black is used in a quantity ranging from 0.1 to 5% by weight, with respect to the polymer.

8. An expandable article, comprising:
   an expandable vinylaromatic polymer according to claim 1, having a density ranging from 5 to 50 g/l and a thermal conductivity ranging from 25 to 50 mW/mK, at least 10% lower than that of equivalent-expanded materials without carbon black.

9. A process for the preparation of an expandable vinylaromatic polymer, comprising:
   polymerizing in aqueous suspension one or more vinylaromatic monomers, optionally together with at least one polymerizable comonomer in a quantity of up to 50% by weight, in the presence of a carbon black having an average diameter ranging from 30 to 2000 nm, a surface area ranging from 5 to 40 m²/g, a sulfur content ranging from 0.1 to 2000 ppm and an ash content ranging from 0.001 to 1%, and in the presence of a peroxide radicalic initiator, optionally containing at least one aromatic ring, and at least one expansion agent added before, during or at the end of the polymerization.

10. The process according to claim 9, wherein the carbon black has weight loss with heat ranging from 0.001 to 1%, an iodine number ranging from 0.001 to 20 g/kg and an absorption value of dibutylphthalate ranging from 5 to 100 ml/(100 g).

11. The process according to claim 9, wherein the polymerization is carried out in the presence of an organic suspending agent, an inorganic suspending agent or both.

12. The process according to claim 11, wherein the inorganic suspending agent is coadjuvated by an anionic surface-active agent or sodium metadisulfite.

13. The process according to claim 9, wherein the polymerization in suspension is effected through a solution of vinylaromatic polymer in the monomer, or mixture of monomers, in which the concentration of polymer ranges from 1 to 30% by weight.

14. The process according to claim 9, wherein, at the end of the polymerizations beads of polymer are obtained in a substantially spherical form, with an average diameter ranging from 0.2 to 2 mm inside which the carbon black filler is homogeneously dispersed.

15. The process according to claim 14, wherein the polymer beads obtained at the end of the polymerization are washed with a non-ionic surface-active agent.

16. The process according to claim 9, wherein during the polymerization, at least one polymerization flame-retardant agent is added in a quantity ranging from 0.1 to 8% by weight, with respect to the weight of the resulting polymer.

17. The process according to claim 9, wherein the at least one expansion agent is added during the polymerization phase and is selected from the group consisting of aliphatic hydrocarbons comprising 3 to 6 carbon atoms, cycloaliphatic hydrocarbons comprising from 3 to 6 carbon atoms, halogenated derivates of aliphatic hydrocarbons comprising from 1 to 3 carbon atoms, carbon dioxide and water.

18. A process for preparing, in mass and continuously, an expandable vinylaromatic polymer which comprises, in series:
  i. feeding a vinylaromatic polymer to an extruder, together with a carbon black filler, having an average diameter ranging from 30 to 2000 nm, a surface area ranging from 5 to 40 $m^2/g$, a sulfur content ranging from 0.1 to 2000 ppm and an ash residue ranging from 0.001 to 1%;
  ii. heating the vinylaromatic polymer to a temperature higher than the relative melting point, to obtain a molten polymer;
  iii. injecting an expanding agent and optionally an additive, into the molten polymer before extrusion through a die; and
  iv. forming expandable beads, through a die, in a substantially spherical form with an average diameter ranging from 0.2 to 2 mm.

19. The process according to claim 18, wherein the carbon black filler has by has a weight loss with heat ranging from 0.001 to 1%, an iodine number ranging from 0.001 to 20 g/kg and an absorption value of dibutylphthalate ranging from 5 to 100 ml/(100 g).

20. The process according to claim 18, further comprising:
  a) pretreating the expandable beads by coating with a liquid antistatic agents, to obtain pre-treated beads;
  b) applying a coating to the pre-treated beads, said coating comprising (i) a mixture of mono-, di- and tri-esters of glycerin with fatty acid, (ii) a metallic stearate or (iii) a combination of (i) and (ii);
  wherein the liquid antistatic agent is selected from the group consisting of amines, tertiary ethoxylated alkylamines and ethylene oxide propylene oxide copolymers.

21. The process according to claim 20, wherein the carbon black filler is also added to the coating together with the mixture of esters.

22. The process according to claim 18, wherein a flame retardant is added in step iii.

23. The process according to claim 20, wherein the metallic stearate is zinc stearate or magnesium stearate.

* * * * *